(12) United States Patent
Kanan et al.

(10) Patent No.: US 11,479,871 B2
(45) Date of Patent: Oct. 25, 2022

(54) ELECTROCHEMICAL CELLS AND CATHODES FOR THE PRODUCTION OF CONCENTRATED PRODUCT STREAMS FROM THE REDUCTION OF CO AND/OR $CO_2$

(71) Applicant: The Board of Trustees of the Leland Stanford Junior University, Palo Alto, CA (US)

(72) Inventors: Matthew W. Kanan, Palo Alto, CA (US); Donald Stephen Ripatti, Palo Alto, CA (US); Thomas R. Veltman, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 480 days.

(21) Appl. No.: 16/543,943

(22) Filed: Aug. 19, 2019

(65) Prior Publication Data
US 2020/0056294 A1    Feb. 20, 2020

Related U.S. Application Data

(60) Provisional application No. 62/719,834, filed on Aug. 20, 2018.

(51) Int. Cl.
*C25B 11/051* (2021.01)
*H01M 4/88* (2006.01)
*C25B 3/00* (2021.01)
*C25B 11/02* (2021.01)
*C25B 13/08* (2006.01)
*C25B 9/19* (2021.01)
*C25B 11/095* (2021.01)

(52) U.S. Cl.
CPC .............. *C25B 11/051* (2021.01); *C25B 3/00* (2013.01); *C25B 9/19* (2021.01); *C25B 11/02* (2013.01); *C25B 11/095* (2021.01); *C25B 13/08* (2013.01); *H01M 4/8807* (2013.01)

(58) Field of Classification Search
None
See application file for complete search history.

(56) References Cited

U.S. PATENT DOCUMENTS

2007/0010396 A1* 1/2007 Giaquinta ............. H01M 4/928
429/506
2011/0262828 A1* 10/2011 Noda .................... H01M 8/102
427/115

* cited by examiner

*Primary Examiner* — Wojciech Haske
(74) *Attorney, Agent, or Firm* — Beyer Law Group LLP

(57) ABSTRACT

A method for depositing a catalyst layer onto a porous conductive substrate is provided. A catalyst ink is provided comprising catalyst particles suspended in a solvent. The catalyst ink is deposited onto a porous conductive substrate, wherein the solvent of the deposited catalyst ink is frozen. The frozen solvent is sublimated, leaving the catalyst layer.

7 Claims, 10 Drawing Sheets
(6 of 10 Drawing Sheet(s) Filed in Color)

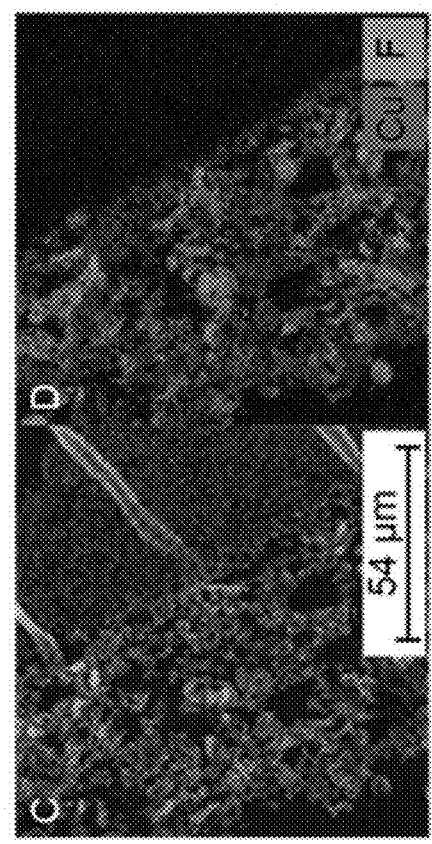
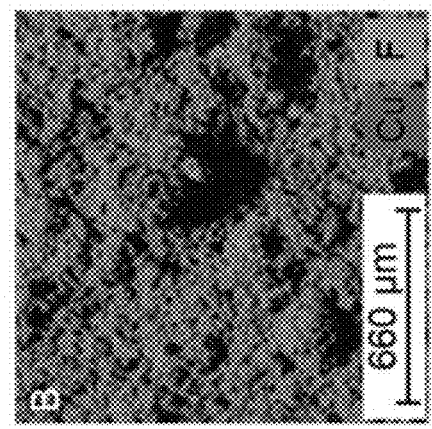
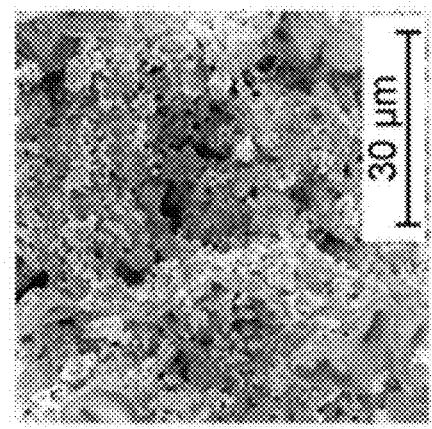

ELECTROCHEMICAL CELLS AND CATHODES FOR THE PRODUCTION OF CONCENTRATED PRODUCT STREAMS FROM THE REDUCTION OF CO AND/OR $CO_2$

CROSS REFERENCE TO RELATED APPLICATION

This application claims the benefit of priority of U.S. Application No. 62/719,834, filed Aug. 20, 2018, entitled ELECTROCHEMICAL CELL FOR THE PRODUCTION OF CONCENTRATED LIQUID PRODUCT STREAMS FROM THE REDUCTION OF CO AND/OR $CO_2$ by Kanan et al., which is incorporated herein by reference for all purposes.

GOVERNMENT RIGHTS

This invention was made with Government support under contracts NNX16AO52A S01 and 80NSSC19M0034 awarded by NASA. The Government has certain rights in the invention.

BACKGROUND OF THE INVENTION

The invention relates to the electrochemical conversion of CO and/or $CO_2$. The invention further relates to electrochemical cells and cathodes for the conversion of CO and/or $CO_2$.

SUMMARY

In accordance with the invention, a method for depositing a catalyst layer onto a porous conductive substrate is provided. A catalyst ink is provided comprising catalyst particles suspended in a solvent. The catalyst ink is deposited onto a porous conductive substrate, wherein the solvent of the deposited catalyst ink is frozen. The frozen solvent is sublimated, leaving the catalyst layer.

In another manifestation, an apparatus for generating concentrated liquid or gas product streams is provided. An electrolysis cell comprises a first current collector, a flow field within the current collector, a cathode in contact with the flow field, an ion transport membrane in contact with the cathode, an anode on the opposite side of the ion transporting membrane from the cathode, and a liquid trap connected to the flow field for receiving exhaust from the flow field, wherein the liquid trap is adapted to remove liquid product from exhaust gas from the flow field.

In another manifestation, a method of forming isotopically labeled organic molecules is provided. Isotopically labeled molecules of CO or $CO_2$ are flowed into a flow field of a current collector. The flow field of the current collector is exposed to a first side of a cathode comprising a gas diffusion electrode, wherein a second side of the cathode is in contact with a first side of an ion transporting membrane, wherein an anode is on a second side of the ion transporting membrane, spaced apart from the cathode, and the anode is in contact with an electrolyte solution. A voltage is applied between the anode and cathode. An exhaust gas is exhausted from the flow field of the current collector. A gas phase or liquid phase product is removed from the exhaust gas.

In another manifestation, a method of forming isotopically labeled organic molecules is provided. Electrolysis provided between reactants of isotopically labeled molecules of CO or $CO_2$ gas and a liquid electrolyte to produce a liquid phase product, a liquid phase exhaust, and a gas phase exhaust of unused CO or $CO_2$ gas and gas phase products. The gas phase exhaust of unused CO or $CO_2$ gas and gas phase products and liquid phase product is flowed to a liquid trap. A liquid phase product is removed from the gas phase exhaust.

The invention and objects and features thereof will be more readily apparent from the following detailed description and appended claims when taken with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A-D show scanning electron microscopy (SEM) and energy dispersive analysis x-ray (EDAX) elemental mapping of a spray-freeze Cu-GDE with a Cu loading of 2200 µg $cm^{-2}$ and a PTFE loading of 4400 µg $cm^{-2}$.

DETAILED DESCRIPTION OF ILLUSTRATED EMBODIMENTS

Figure 1:
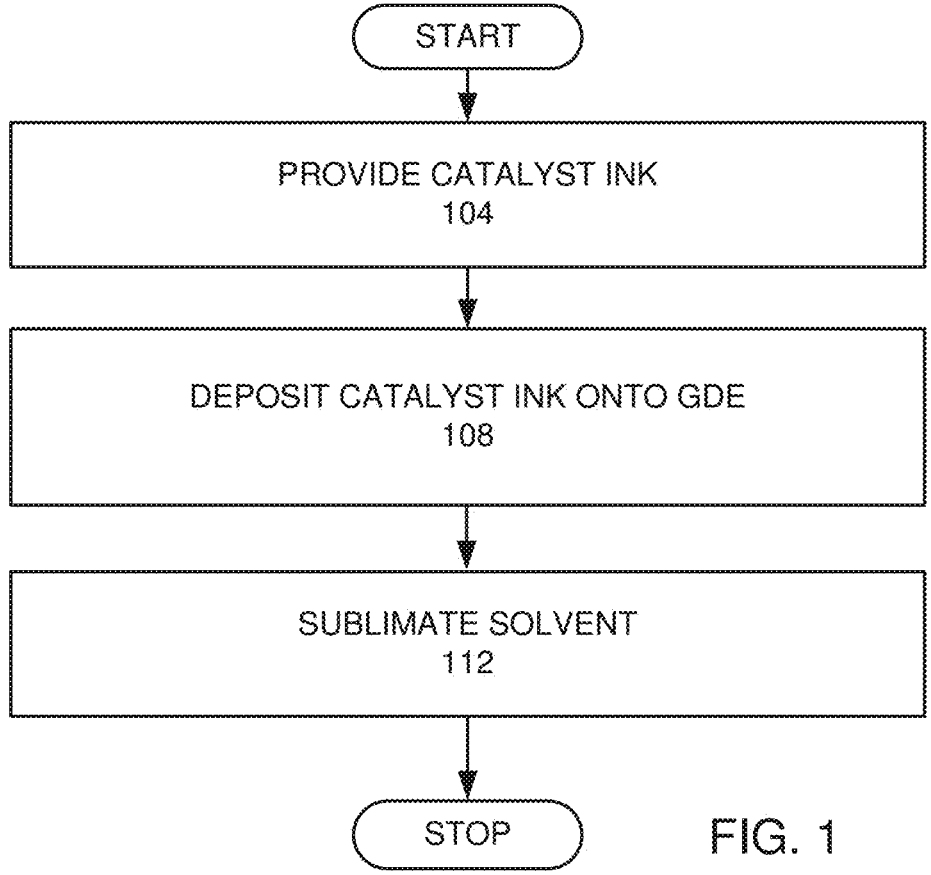
FIG. 1 is a high level flow chart of an embodiment.

Electrochemical processes that convert $CO_2$ and CO into fuels and chemicals have attracted attention as a possible means to electrify chemical production and utilize surplus renewable electricity, among other applications. Products include, for example, methane, ethylene, ethanol, propanol, and acetate. To be efficient, electrosynthesis must make concentrated product streams at high rates with modest potentials, but the combination of these features has not been established for $CO_2$ or CO electrolysis.

One challenge is that the available catalysts for $CO_2$ or CO reduction (the cathodic reactions) typically have relatively low activity per catalyst surface area, especially for the electrosynthesis of products containing more than one carbon. It is therefore desirable to use a high catalyst loading per electrode area to minimize the voltage requirement and the overall footprint of the device and maximize the single-pass conversion to make concentrated product streams. However, the mass transport requirements for electrolysis make it challenging to prepare functional cathodes with high catalyst loadings. A common design is to deposit a catalyst layer on a hydrophobic porous carbon electrode such as a gas diffusion electrode (GDE). In order to be effective, the catalyst layer must be electrically conductive and have good gas and electrolyte (ion) transport properties. With common deposition techniques such as drop-drying and spray deposition, one or more of these properties is compromised as the catalyst layer exceeds a certain thickness, typically on the order of a few microns. The spray-freeze deposition method described herein overcomes these challenges and enables the deposition of thick catalyst layers with high catalyst loading that maintain electrical conductivity, ion transport, and gas transport.

A related problem is the difficulty of producing concentrated liquid products in cases where the catalyst produces liquid-phase products or both liquid and gas-phase products. Currently, the design for separating the liquid and gas phase product streams resulting from $CO_2$ or CO reduction revolves around interfacing the catalyst-coated side of the GDE with a flowing bulk electrolyte. Reactant gas is fed to the back of the GDE, where it travels to the front face that contains the catalyst layer which is in contact with bulk electrolyte. The reactant gas is reduced at the catalyst layer and the liquid products remain in the bulk electrolyte, while gaseous products exit through the porous carbon electrode. This design has drawbacks which limit the applicability of this technology. Firstly, all implementations of this design have resulted in dilute liquid phase product streams (typically 1-5 mM). These dilute product streams are energy intensive to concentrate, and hinder the economic viability of the liquid phase products. In addition, the durability of the electrodes in this configuration is poor. Over time the electrodes begin to plug with water and fail to deliver reactant gas to the catalyst layer. This poses a problem, as the frequent replacement of this component adds cost to operating such a system, detracting from the viability.

The cell design described in various embodiments addresses these two critical issues associated with previous designs and allows for the production of liquid phase products at concentrations >1 M. Various embodiments replace bulk electrolyte with an ionically conductive membrane. By selecting an appropriate membrane, various embodiments are able to leverage the osmotic drag and other permeative forces to deliver an excess of water to the catalyst layer supported on the GDE. This excess water extracts the liquid phase products to form a highly concentrated product stream. The liquid product travels through the GDE and is continuously removed from the backside of the GDE by the flux of reactant gas delivered by a high density interdigitated gas flow field. In addition, any gaseous products are also removed by the flux of reactant gas. Both gas and liquid products exit the cell together and can be separated by a simple gravity trap. Various embodiments are described in Ripatti, D. S., Veltman, T. R., Kanan, M. W. "Carbon Monoxide Gas Diffusion Electrolysis that Produces Concentrated C2 Products with High Single-Pass Conversion" *Joule* 3, 240-256 (2019), which is incorporated by reference for all purposes.

Gas Diffusion Electrodes with High Catalyst Loading

Decreasing the overall energy demand for electrolysis technologies is critical for reducing operating cost. The amount of voltage required to operate a cell at a desired rate of reaction is a key determinant of the energy demand. For any electrochemical process, there is a minimum amount of voltage required, which is determined by the thermodynamics of the chemical reaction. Voltage beyond this minimum that must be applied to attain a particular rate, referred to as overpotential or overvoltage, reduces the energy efficiency of the cell. Currently, much of the overpotential required to operate a $CO_2$ or CO electrochemical cell is incurred by the cathode, where $CO_2$ or CO reduction takes place. The cathode overpotential (and hence the cell potential) can be lowered and the single-pass conversion (and hence the product concentration) can be increased by increasing the catalyst loading on the cathode GDE. However, generating functional catalyst layers with high catalyst loading is challenging because the catalyst layer must simultaneously provide the catalyst particles with good gas transport and electrolyte transport while maintaining electrical conductivity.

Many of the traditional methods for preparing GDE catalyst layers, developed by the fuel cell community, are not compatible with the demands of CO or $CO_2$ reduction in a GDE. Fuel cell GDE electrodes are commonly fabricated by spray deposition of a catalyst-containing ink onto a GDE substrate. The porosity of the resulting GDE catalyst layer is a key parameter that affects the mass transport and the electrochemically active surface area. For fuel cell GDEs, the porosity of the catalyst layer is often controlled by supporting the catalyst particles on carbon particles or by the addition of a pore forming agent. Unfortunately, carbon materials catalyze the $H_2$ evolution reaction under $CO_2$ or CO reduction conditions, which can result in low selectivity. Many of the pore forming agents used for fuel cell catalyst layers require high temperatures to liberate gas (>200° C.) or must be dissolved out with acid. Hydrophobicity in proton exchange membrane fuel cell (PEMFC) GDEs is commonly modulated by the addition of polytetrafluoroethylene (PTFE) dispersions to the catalyst inks. These dispersions commonly contain viscous high boiling point solvents or surfactants, such as Zontyl, which must be baked out (>200° C.) of the electrode prior to use. These high-temperature steps can compromise the performance of $CO_2$ or CO reduction catalysts by causing the particles to sinter or annealing out beneficial defect structures.

Freeze casting of catalyst layers has been employed by the solid oxide fuel cell (SOFC) community to generate highly porous electrodes. This technique commonly involves freezing a suspension of catalyst particles in water or t-butyl alcohol in contact with a cryostated solid copper block and then sublimating the frozen monolith to generate a high porosity electrode. Unfortunately, this process is slow and expensive to scale because it requires specialized equipment to uniformly control the rate of freezing and vacuum pumps to remove the solvent. Spray deposition, which is used industrially to produce fuel cell electrodes, is more amenable to large-scale production. We hypothesized that hybridizing spray deposition with freeze casting could provide a way to prepare high-loading catalyst layers on a GDE with control over the porosity and hydrophobicity to achieve good gas transport, ion transport, and electrical conductivity. Furthermore, a hybrid spray deposition-freeze casting approach could provide a cost effective route to fabricating GDE catalyst layers on a large scale.

To facilitate understanding, FIG. 1 is a high level flow chart of an embodiment. A catalyst ink is provided (step 104). In this embodiment, the catalyst ink is a suspension comprising a solvent with suspended catalyst particles and hydrophobic polymer particles. In this embodiment, the catalyst particles are copper particles and the hydrophobic polymer particles are PTFE particles. In this embodiment, the catalyst ink comprises a viscous solvent which has both a high melting point and low boiling point, such as t-butyl alcohol (mp=25° C., bp=82° C.). This solvent's melting point is depressed by the addition of a co-solvent such that its melting point is just below room temperature. In this embodiment, the solvent is a mixture of two different solvents.

Figure 2:
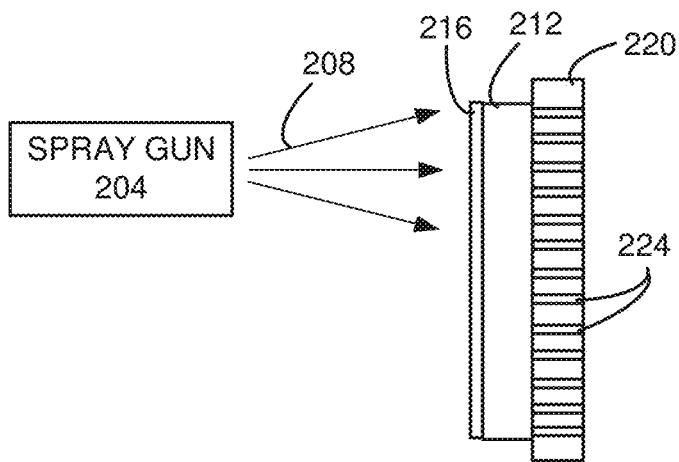
FIG. 2 is a schematic view of a system used to provide the hybrid freeze-spray casting used in an embodiment.

The catalyst ink is deposited onto a porous conductive substrate, such as a gas diffusion electrode (GDE) (step 108). In this embodiment, a hybrid freeze-spray casting technique is used to deposit the catalyst ink onto the GDE (step 108). FIG. 2 is a schematic view of a system used to provide the hybrid freeze-spray casting used in this embodiment. The ink is provided to a spray deposition gun 204. The spray deposition gun 204 sprays the ink 208 onto a GDE 212, to form a layer of the ink 216 on the GDE 212. When the ink is sprayed from the nozzle of the spray deposition gun 204, evaporative cooling reduces the temperature below the melting point of the solvent, which causes the solvent to either freeze just prior to or just after landing on the GDE 212 surface.

Figure 3A:
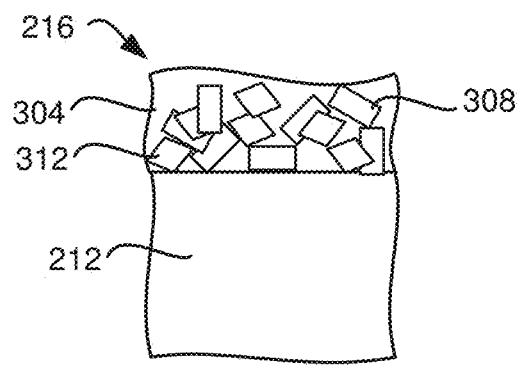
FIGS. 3A-B are schematic enlarged views of part of a surface of the GDE processed according to an embodiment.

FIG. 3A is a schematic enlarged view of part of a surface of the GDE 212 after a layer of the ink 216 has been deposited on the GDE 212 (step 108). The layer of ink 216 comprises frozen solvent 304, catalyst particles 308, and hydrophobic polymer particles 312. The catalyst particles 308 are schematically illustrated as rectangles and the hydrophobic polymer particles 312 are schematically illustrated as diamonds for clarity. An actual SEM of an actual layer of ink 216 will be shown later. The schematic illustration of FIG. 3A is to illustrate that the ink layer 216 after deposited is a frozen solid solvent 304 embedded with particles of catalyst particles 308 and hydrophobic polymer particles 312.

In some embodiments, the solvent 304 may freeze after leaving the spray deposition gun 204 and before contacting the GDE 212 surface. In other embodiments, the solvent 304 freezes within 5 minutes of contacting the GDE 212 surface. In all embodiments, at some point, a frozen solvent 304 layer is formed embedded with catalyst particles 308 and hydrophobic polymer particles 312.

The frozen solvent 304 layer is sublimated. In this embodiment, the GDE 212 is positioned over a vacuum pin table 220 with holes 224. Air is continuously drawn through the holes 224, which draws air through the GDE 212. The porous conductive substrate forming the GDE 212 has a sufficiently high porosity to allow high enough flow of air to pass through the GDE 212 and the vacuum pin table 220 to allow sublimation of the frozen solvent 304. In addition, the porous conductive substrate is electrically conductive. In this example, the porous conductive substrate is formed from electrically conductive carbon materials. This flow of air through the GDE 212 also enforces the sublimation of the high surface area solid catalyst-t-butyl alcohol suspension 304. The sublimation vaporizes the solid solvent so that the solvent goes from a solid to a vapor without going to a liquid phase. The high vapor pressure and surface area of the solid solvent 304 gives rise to a rapid sublimation without the use of a high vacuum that is required for traditional freeze casting. By adjusting system parameters such as concentration, melting point and spray height of the freeze-spray deposition, it is possible to tune the morphology and porosity of the catalyst layer. Furthermore, t-butyl alcohol is able to suspend PTFE nano-particles in the absence of any additional surfactants or high boiling point solvents, which provides a method for tuning the hydrophobicity of the catalyst layer.

Figure 3B:
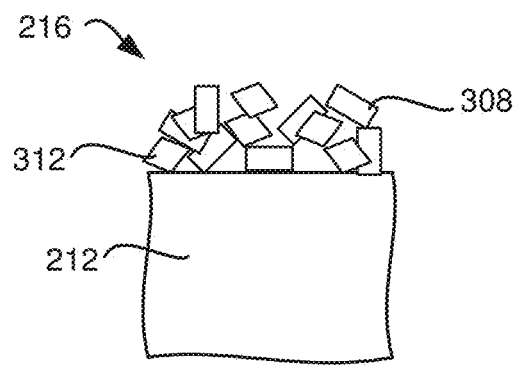

FIG. 3B is a schematic enlarged view of part of a surface of the GDE 212 after the frozen solvent has been sublimated (step 112). The solvent is removed, but the catalyst particles 308 and the hydrophobic polymer particles 312 remain. The remaining catalyst particles 308 and hydrophobic polymer particles form a catalyst layer from the deposited catalyst ink layer. Specific Example:

A 1 M solution of isopropanol in tert-butanol is used as the solvent to prepare the ink. The solvent has a melting point of approximately 15° C. The ink is prepared by first suspending the PTFE (8 mg mL$^{-1}$) in the solvent via sonication under argon for 10 minutes. This suspension is then added to the Cu catalyst such that the final concentration of Cu is 4 mg mL$^{-1}$. It is sonicated for 1 hour and ice is periodically added to the sonication bath to prevent the ink from getting hot. 15 PSI of $N_2$ gas is supplied to an Iwata ICM 3000 spray gun equipped with a C1 needle which is calibrated such that the flow rate of 1 M isopropanol in tert-butanol is 1 mL min$^-$ through the gun. The gun is affixed to a custom built computerized numerical control (CNC) plotter, which can control the position of the gun and actuate the flow of ink. The GDE electrode is affixed to a vacuum pin table with a mask which has an open area of 10 cm$^2$. The flow of air through the vacuum pin table is fixed at 60 mL min$^{-1}$. The height of the vacuum pin table is adjusted such that the tip of the gun is positioned 2 inches above the GDE electrode. The catalyst ink is added to the gun which is then rastered over the GDE area. Cycles are repeated until the desired loading is obtained. The mass change can be quantified by measuring the weight of the GDE substrate before and after deposition. After the catalyst layer is deposited, 3 mL of 2.5 wt % Nafion 520D solution in isopropanol is sprayed over the catalyst layer to act as a binder.

A GDE with a catalyst layer containing a Cu catalyst is designated as a "Cu-GDE". The Cu-GDEs prepared by the hybrid spray deposition-freeze casting method are designated as "spray-freeze Cu-GDEs". The spray-freeze Cu-GDEs were prepared using the general procedure described above. The GDE substrate was an AvCarb™ 2230 GDE composed of two conductive, hydrophobic carbon materials: a microporous layer (MPL) on top of a carbon fiber mat known as the gas diffusion layer (GDL). Cu catalyst particles were synthesized by $NaBH_4$ reduction of $Cu(OAc)_2$ in 2-ethoxyethanol and then suspended in the PTFE-containing 1 M isopropanol in t-butanol to make a catalyst ink. The ink was deposited via the hybrid spray deposition-freeze casting method with multiple cycles to yield samples with different Cu loadings. After catalyst layer deposition, the electrode was spray-coated with Nafion 520 dispersion to act as a binder. FIGS. 4A-D show scanning electron microscopy (SEM) and energy dispersive analysis x-ray (EDAX) elemental mapping of a spray-freeze Cu-GDE with a Cu loading of 2200 μg cm$^{-2}$ and a PTFE loading of 4400 μg cm$^{-2}$. FIG. 4A shows a top view SEM of the resulting deposited layer. FIG. 4B shows a top-view EDAX elemental mapping of the deposited layer with the copper catalyst particles shown as a more reddish color and the PTFE hydrophobic particles as a more greenish color. FIG. 4C is a cross-sectional SEM of a deposited catalyst layer on the GDE. The catalyst layer is the porous material on the left side of the image while the underlying GDE is the denser material on the right side of the image. FIG. 4D is an EDAX elemental mapping of a cross-section of the catalyst layer on the GDE, The catalyst layer is >50 μm thick and highly porous with an even distribution of Cu and PTFE.

To evaluate the performance of spray-freeze Cu-GDEs, samples were prepared with the following mass loading of Cu per geometric area: 730 and 2600 μg cm$^{-2}$ (mass of Cu per geometric GDE area). As a baseline comparison sample, a drop-dried Cu-GDE was prepared by suspending the Cu catalyst in isopropanol to make an ink and then drop-drying the ink at a loading of 240 ug cm$^{-2}$ onto the GDE. The drop-dried catalyst layer was subsequently spray coated with Nafion 520 dispersion to act as a binder. Cross-sectional SEM images revealed that the Cu was confined to a 1-2 μm layer on top of the MPL.

Figure 5:
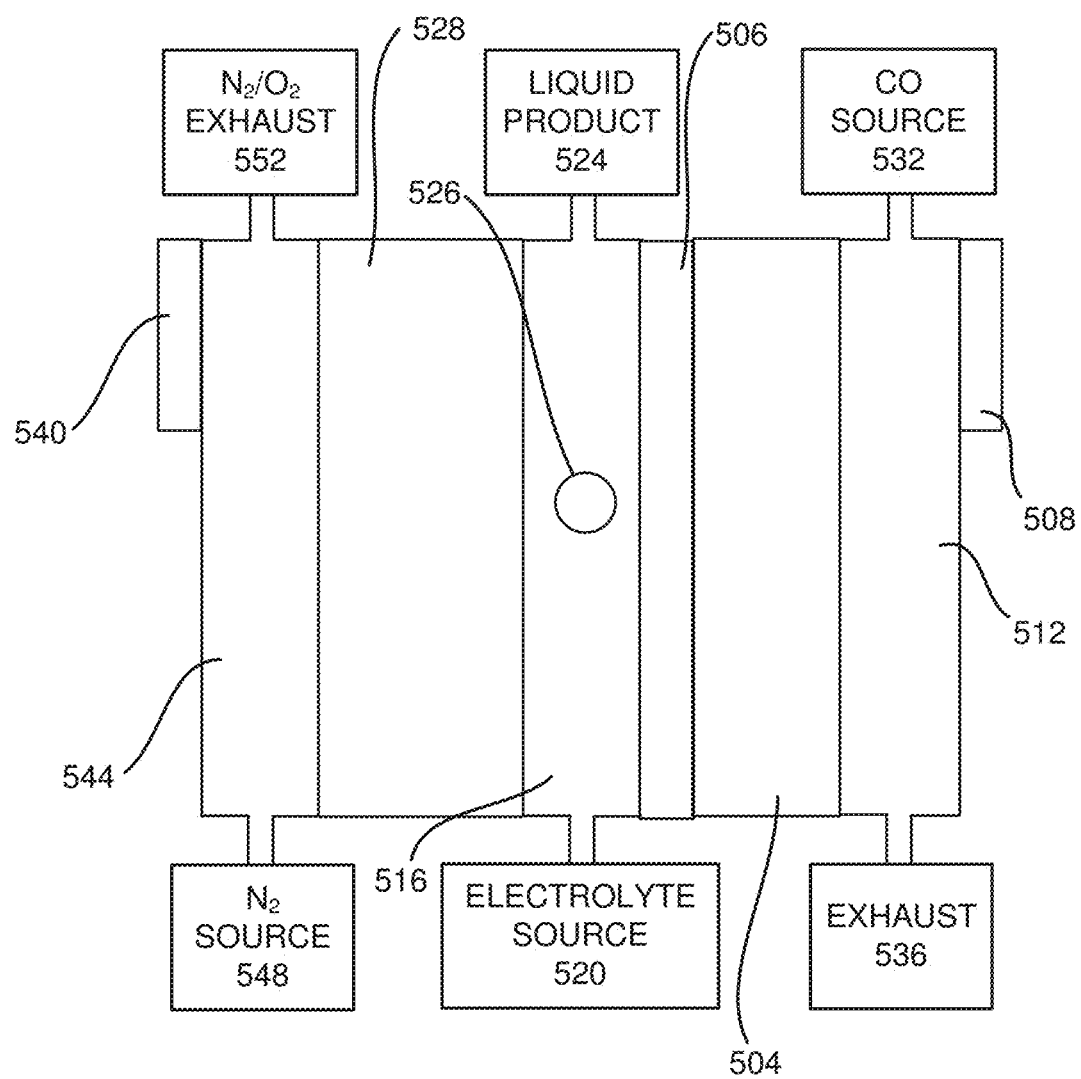
FIG. 5 is a schematic illustration of a cell used in an embodiment.

To evaluate the performance of the Cu-GDEs prepared with different catalyst layers, CO electrolysis was investigated using the cell design shown in FIG. 5. FIG. 5 is a schematic illustration of a cell 500 used in this embodiment. For all of the experiments below, the GDE 504 was backed by a Ti current collector 508 with a laser-engraved 1 cm$^2$ interdigitated flow field 512. The copper-containing catalyst layer 506 is on the opposite side of GDE 504. The GDE 504 and catalyst layer 506 together comprise the Cu-GDE. The catalyst layer 506 is in contact with a 1 cm×1 cm×1.5 mm electrolyte chamber 516 containing the electrolyte (the catholyte) where liquid-phase CO reduction products accumulate. The electrolyte chamber 516 has ports to enable catholyte flow from an electrolyte source 520 to a liquid product output 524 and a port connecting to an Ag/AgCl reference electrode 526. On the opposite side of the electrolyte chamber 516 from catalyst layer 506 is membrane electrode assembly (MEA) electrode 528. When CO is flowed from a CO source 532 into the flow field 512, it enters the GDE 504 from the flow field 512 and passes through the GDE 504 to reach the catalyst layer 506 at the catholyte interface. Gaseous products and unreacted CO flow out the exit port of the flow field 512 to exhaust 536 and are analyzed by gas chromatography (GC). The anode side is a membrane electrode assembly (MEA) 528 composed of an IrO$_2$ on carbon (IrO$_2$/C) catalyst layer pressed onto a Nafion membrane. In this example, the ion transport membrane is a polymeric separator, such as a Nafion membrane. The MEA is backed by a second Ti current collector 540 with a flow field 544 through which humidified N$_2$ is flowed from a N$_2$ source 548 and to an N$_2$/O$_2$ exhaust 552 to supply H$_2$O to the anode.

Electrolysis was performed with flows of 0.5 standard cubic centimeters per minute (sccm) of CO through the Cu-GDE, 150 μL min$^{-1}$ of 1 M NaOH through the catholyte chamber, and 10 sccm of humidified N$_2$ through the anode. Tafel data were collected by performing stepped-current chronopotentiometry at current densities ranging from 12 to 144 mA cm$^{-2}$. The duration of each step was 9 min, which enabled GC quantification of the gas-phase products and collection of catholyte aliquots for NMR analysis of the liquid-phase products.

Figure 6:
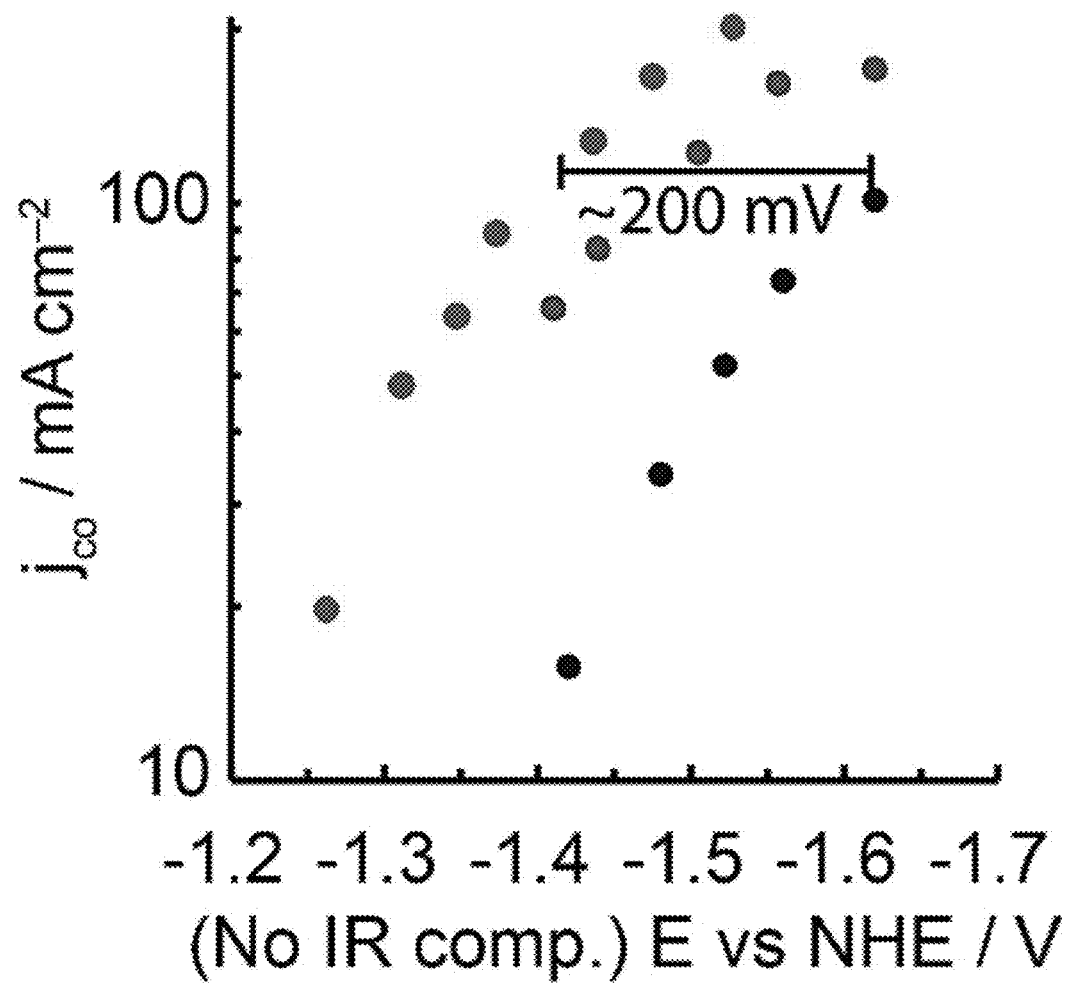
FIG. 6 shows Tafel plots of the partial geometric current density for CO reduction to all products ($j_{CO}$) vs the measured cathode potential, reported vs the normal hydrogen electrode (NHE) without IR compensation, for an electrolysis performed in the cell depicted in FIG. 5.

FIG. 6 shows Tafel plots of the partial geometric current density for CO reduction to all products ($j_{CO}$) vs the measured cathode potential, reported vs the normal hydrogen electrode (NHE) without IR compensation. For drop-dried Cu-GDE, a $j_{CO}$ of 101 mA cm$^{-2}$ was achieved at −1.63 V vs NHE. The spray-freeze Cu-GDEs achieved greater $j_{CO}$ at substantially less negative potentials (lower overpotentials). For example, the spray-freeze Cu-GDE with 2600 μg cm$^{-2}$ Cu loading required ~200 mV less overpotential than the drop-dried Cu-GDE for the same $j_{CO}$ and was able to achieve a higher maximum $j_{CO}$ of 200 mA cm$^{-2}$.

Figures 7A, 7B:
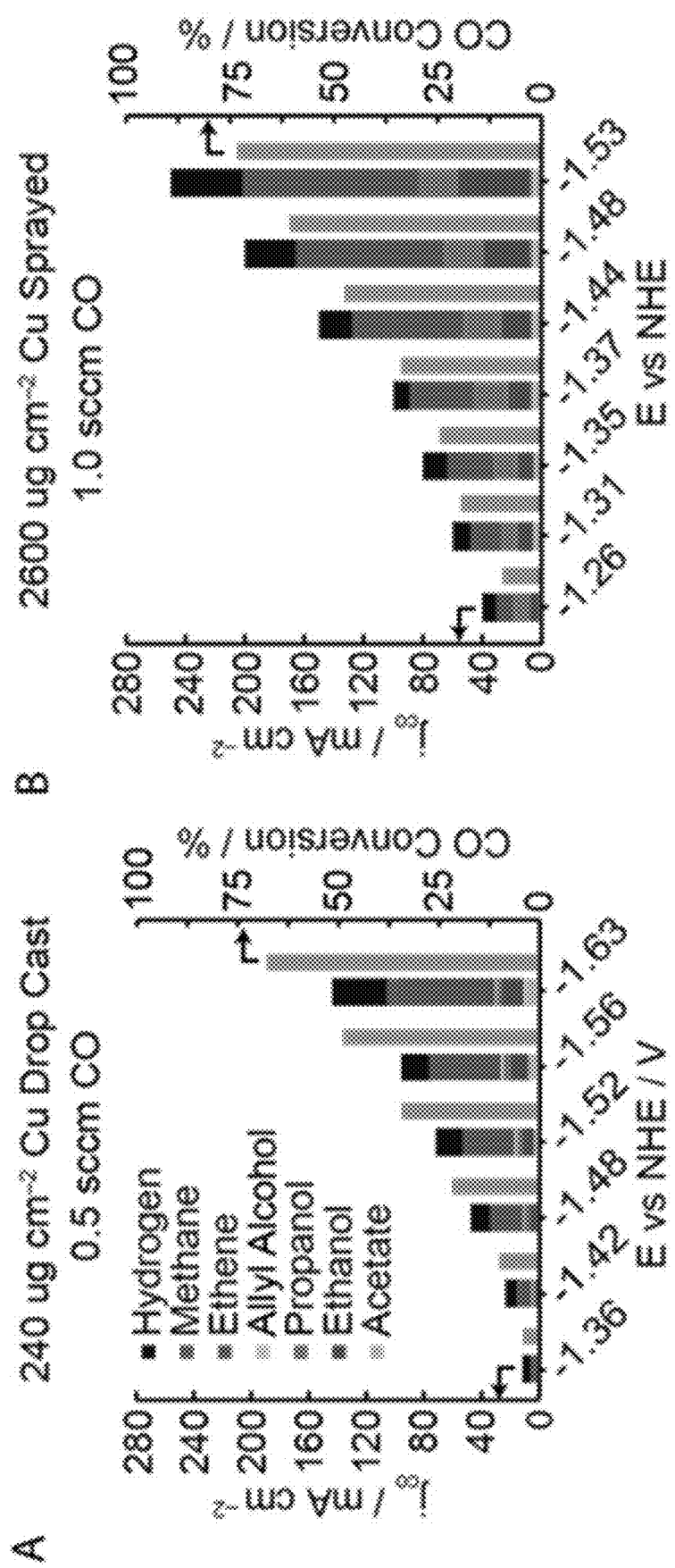
FIGS. 7A-B show a product distribution at different total current densities and the measured cathode potential (without IR compensation) for drop-dried Cu-GDE and the spray-freeze Cu-GDE with 2600 µg $cm^{-2}$ loading evaluated in the cell depicted in FIG. 5.

The product distribution at different total current densities and the measured cathode potential (without IR compensation) for drop-dried Cu-GDE and the spray-freeze Cu-GDE with 2600 μg cm$^{-2}$ loading are shown in FIGS. 7A-B. For drop-dried Cu-GDE (FIG. 7A), the electrode was stepped from 12 to 144 mA cm$^{-2}$. The total Faradaic efficiency (FE) for CO reduction products ranged from 65% to 76%. Ethylene was the major product overall, and the exclusive gas-phase product except at the most negative potentials, at which small amounts of methane were produced. The remaining CO reduction products were oxygenates including ethanol, acetate, and propanol. When $j_{CO}$ was 101 mA cm$^{-2}$, the CO single-pass conversion was 65% and the product gas stream was 18 vol % ethylene.

For the spray-freeze Cu-GDE (FIG. 7B), the total current density was stepped from 40 mA cm$^{-2}$ to 250 mA cm$^{-2}$. The total FE for CO reduction products ranged from 78% to 89%. Ethylene was the exclusive CO reduction gas-phase product and the oxygenates were composed of mostly ethanol and propanol with smaller amounts of acetate. At the highest current density, $j_{CO}$ was 200 mA cm$^{-2}$, the CO single-pass conversion reached 74% and the gas product stream was 25 vol % ethylene.

Electrochemical Cell Design for Production of Concentrated Gas and Liquid Products In another embodiment, a novel electrochemical cell for the reduction of CO and/or CO$_2$ to form concentrated liquid product streams is provided. The liquid products can be acetate, ethanol, propanol, allyl alcohol, formate, glycol, acetone, acetaldehyde, and propionaldehyde. Additionally, gaseous products can be generated such as ethylene, ethane, acetylene, and methane.

Figure 8:
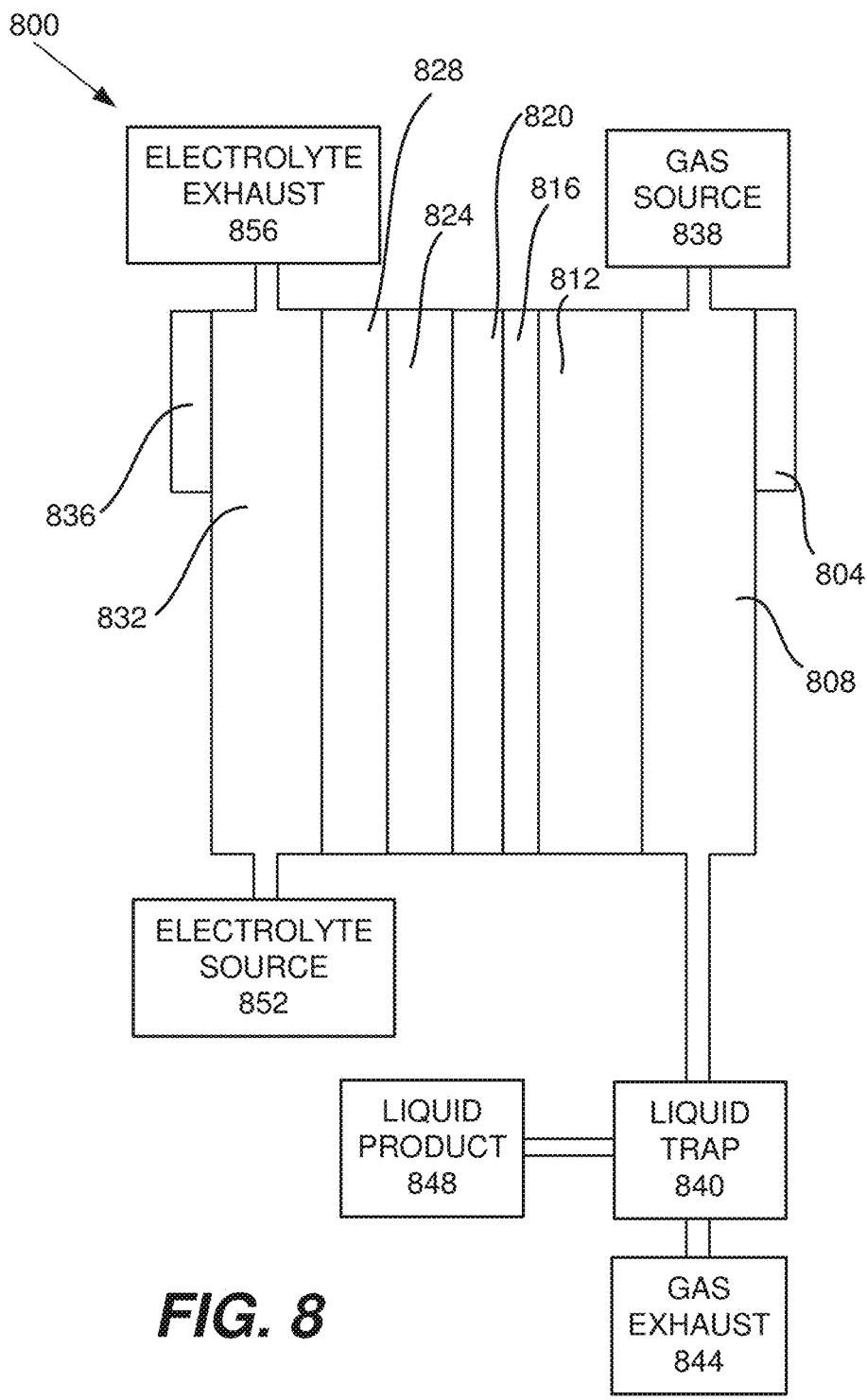
FIG. 8 is a schematic illustration of an electrolysis cell 800 used in another embodiment.

FIG. 8 is a schematic illustration of an electrolysis cell 800 used in this embodiment. The electrolysis cell comprises a first current collector 804. A flow field 808 is electrically connected to the first current collector 804. In an embodiment, the flow field 808 is integrated into the first current collector 804. However, the first current collector 804 and the flow field 808 are illustrated separately for clarity. A first side of a GDE 812 is in contact with the flow field 808. A cathode catalyst layer 816 is on the second side of the GDE 812. The GDE 812 and the cathode catalyst layer 816 make up a cathode. A first side of an ion transport membrane 820 is in contact with cathode catalyst layer 816. An anode is on a second side of the ion transport membrane 820. The anode comprises of a porous conductive substrate 824 adapted for flowing aqueous electrolyte with an anode catalyst layer 828. The anode is contained in an electrolyte chamber 832 and electrically connected to a second current collector 836. In this embodiment, the second current collector 836 is electrically connected to the anode through the electrolyte chamber 832. A cathode gas source 838 is in fluid connection with and provides CO gas to the flow field 808. Exhaust from the flow field 808 is provided to a trap 840. The trap 840 separates and provides as output gas exhaust 844 and liquid product 848. An electrolyte source 852 provides electrolyte to the electrolyte chamber 832. Exhaust is provided from the electrolyte chamber 832 to the electrolyte exhaust 856. In some embodiments, the electrolyte exhaust 856 is connected to the electrolyte source 852 and the electrolyte is circulated through the electrolyte chamber 832 during electrolysis. Multiple electrolysis cells 800 may be combined to form a stack.

In an example of an embodiment, the GDE 812 is coated with a cathode catalyst layer 816 capable of performing CO and or $CO_2$ reduction such as Cu, Pd, In, Sn, Au, Ag, Fe and a binder, such as Nafion, paraffin, and/or Teflon dispersion. The ion transport membrane 820 conducts anions and/or cations and must transport water. The anode performs an oxidative chemistry such as water, hydroxide, or chloride oxidation. The cathode performs CO and/or $CO_2$ reduction. The cathode catalyst layer 816 is in direct contact with the membrane 820. The gas flow field 808 is in contact with GDE 812 on the opposite side of the cathode catalyst layer 816. The gas flow field comprises interdigitated flow channels, which transport CO and or $CO_2$ through the GDE 812 to the cathode catalyst layer 816. In addition to maintaining the ionic balance between the anode and cathode, the ion transport membrane 820 transports water from the anode towards the GDE 812. Any excess of water above what is required for electrosynthesis at the cathode acts to solubilize the liquid products formed from the electrochemical reduction of CO and or $CO_2$ to form a concentrated liquid product, as a liquid phase solution. The active flow of CO and or $CO_2$ gas through the GDE 812 resulting from the interdigitated flow field 808 configuration removes the concentrated liquid and gaseous products from the cathode. Both liquid and gaseous products exit the electrolysis cell 800 from the flow field 808 to the trap 840. In this embodiment, the trap 840 is a simple liquid gravity trap that separates the liquid from the gaseous products. In the description below, an embodiment is provided with >100 mA $cm^{-2}$ CO reduction to $C_2$ products and direct production of a liquid product that is 0.87 M in acetate at a total cell potential of 2.3 V over 24 h.

As one example, an electrolysis cell 800 was prepared in which ionic transport is mediated by a Nafion 117 ion transport membrane 820 pressed between a GDE 812 coated with a Cu-containing cathode catalyst layer 816 and a porous Ni-coated Ti foam anode. The GDE 812 and the Cu-containing cathode catalyst layer 816 together are designated as the Cu-GDE. The electrolysis cell 800 contains no catholyte chamber or reference electrode. The absence of a catholyte allows the electrolysis cell 800 to be operated at elevated CO pressure. The foam anode sits flush in a recessed pocket in the anode current collector block. During electrolysis, the anolyte is recirculated through the electrolytic chamber 832 to remove $O_2$ and supply electrolyte to the anode in contact with the Nafion 117 membrane 820. The cathode side is equipped with a trap 840 to collect liquid-phase products. After the trap 840, the gas passes through a check valve, where it is diluted with $N_2$ and sent to a gas chromatograph (GC).

Figure 9A:
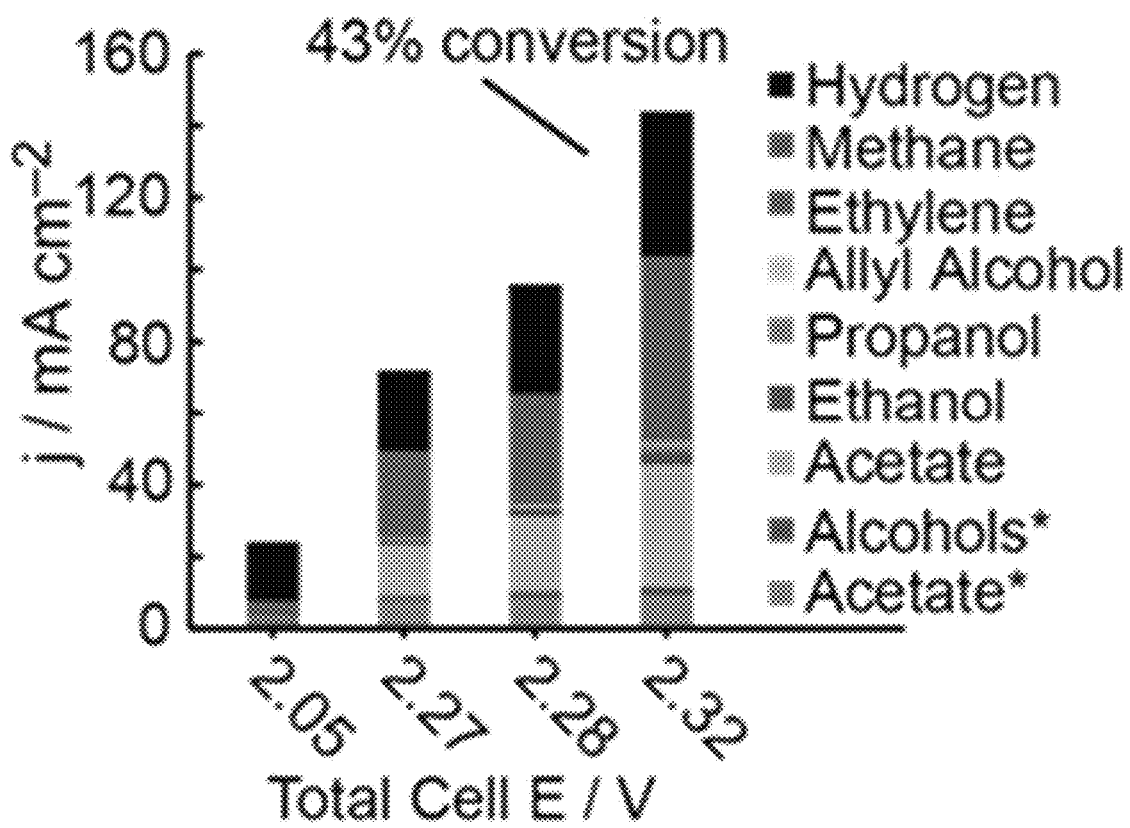
FIG. 9A shows the product distributions and the total cell voltage for a series of 24 h electrolyses performed at 24 to 144 mA $cm^{-2}$ in the cell depicted in FIG. 8.
Figure 9B:
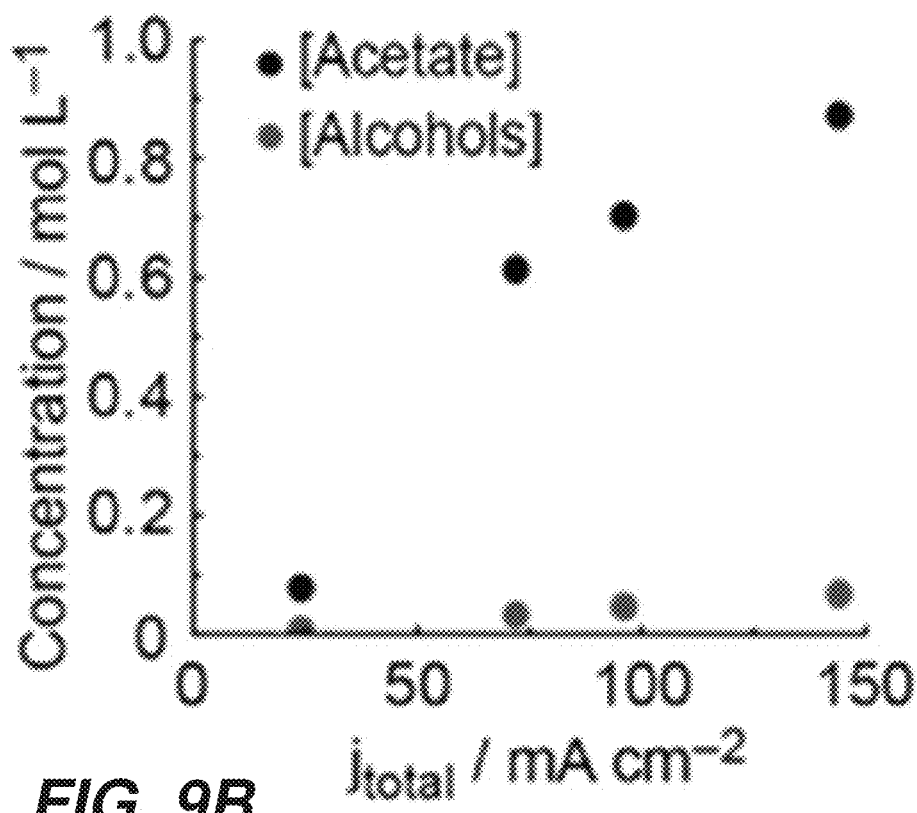
FIG. 9B shows the concentration of acetate and alcohols directly obtained from the liquid trap after each 24 h electrolysis as a function of the galvanostatic current density.

Galvanostatic electrolyses were performed in this cell with 1 M NaOH recirculating through the anode and 4 bar CO flowing at 1.0 sccm through the cathode. For an initial evaluation, a drop-dried Cu-GDE was used. FIG. 9A shows the product distributions and the total cell voltage for a series of 24 h electrolyses performed at 24 to 144 mA $cm^{-2}$. As expected, ethylene was the dominant gas-phase product. Remarkably, a highly concentrated liquid-phase product stream was collected from the trap in the gaseous outflow of the cathode. FIG. 9B shows the concentration of acetate and alcohols directly obtained from the trap after each 24 h electrolysis as a function of the galvanostatic current density. With a total current density of 144 mA $cm^{-2}$, the cell produced 7.3 ml of a liquid product that was 0.87 M in acetate, 0.07 M in $C_{2+}$ alcohols and 2.75 M NaOH. This liquid product concentration can be further increased to 1.21 M acetate if a Nafion 1110 membrane is used in place of the Nafion 117 membrane. Increasing the membrane thickness has no effect on the product selectivity at the same total current density, but does necessitate an additional 40 mV of total cell potential. The thicker Nafion 1110 membrane decreases the volume of water crossing from the anode to the cathode, which increases the liquid product concentration. To our knowledge, the maximum concentration of a liquid $C_{2+}$ product that has been achieved in previous electrolysis studies, described in S. Ma, M. Sadakiyo, R. Luo, M. Heima, M. Yamauchi and P. Kenis, *J. Power Sources*, 2016, 301, 219-228, is 0.024 M. The partial current density for acetate that was collected in the liquid trap was 34 mA $cm^{-2}$, corresponding to a synthesis rate of 317 μmol $cm^{-2}$ $h^{-1}$.

The aqueous acetate and hydroxide collected from the trap indicates that liquid solutions are transported through the GDE under steady-state electrolysis conditions and swept away by the gas flow in the flow field. Excess water is supplied to the Cu-GDE by osmotic drag from the $Na^+$ transport through the Nafion. Since the hydrophobic Teflon coating on a carbon GDE is heterogeneous, liquid may be transported through the GDE via hydrophilic channels in the microporous carbon layer. If the exclusive mode of ion transport in the cell were $Na^+$ transport from anode to cathode, the resulting concentration of NaOH in the liquid trap should be ca. 15 M at 144 mA $cm^{-2}$. The much lower 2.75 M concentration observed in the liquid product stream indicates that $HO^-$ transport exceeds $Na^+$ transport by a ~3:1 ratio during electrolysis, corresponding to a $Na^+$ transfer number of 0.25.

In addition to the products in the trap, smaller amounts of acetate and alcohol products were found in the NaOH anolyte. The amount of products in the anolyte was essentially invariant for electrolyses at 72 to 144 mA $cm^{-2}$ and corresponded to ~9 mA $cm^{-2}$ of $j_{CO}$, as shown in FIG. 9A, which suggests that the mechanism for product loss to the anolyte is limited by the transport through Nafion at currents greater than 72 mA $cm^{-2}$. As a result, the loss to the anolyte becomes proportionally less significant as the current increases.

Figure 9C:
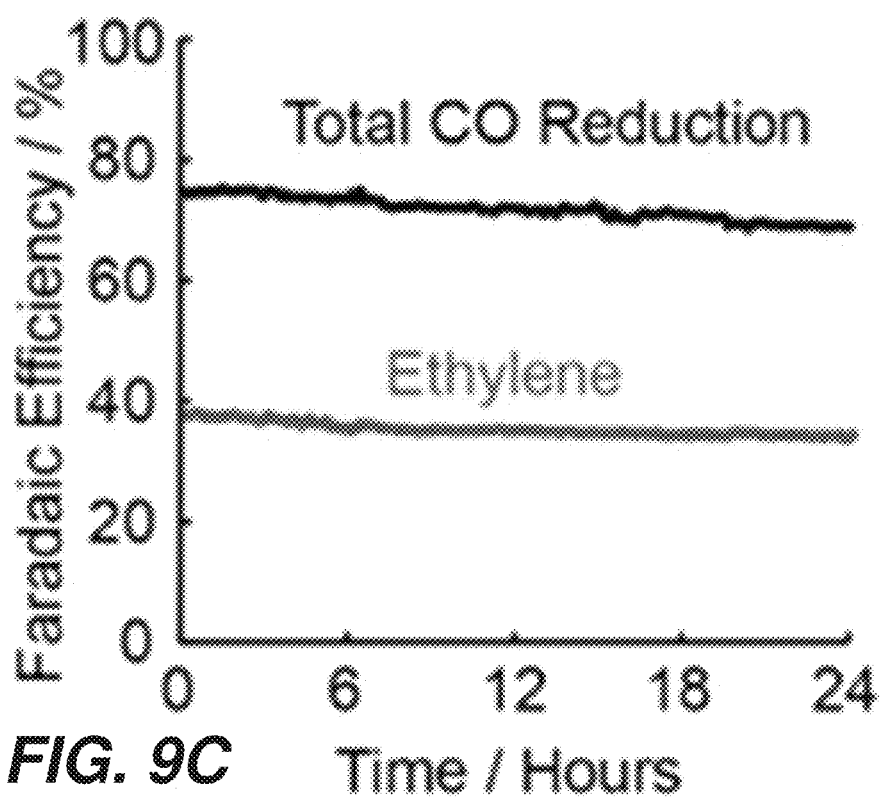
FIG. 9C shows the total cell voltage and the product distribution.

Overall, the cell requires 2.32 V total cell voltage to attain 144 mA $cm^{-2}$ total current density. The voltage shows an increase of only 13 mV over 24 h at 144 mA $cm^{-2}$. The average single-pass CO conversion at this current density was 46% and the average total FE for CO reduction was 72%. Based on the integration of the $H_2$ peak in the GC, the FE declined by ~5% over the course of the electrolysis. Given the total cell voltage, and the product distribution shown in FIG. 9C, the voltage efficiency for CO conversion to ethylene and acetate was calculated to be 24%.

Sustainable operation of the cell requires recovering the NaOH from the liquid product stream for re-addition to the anolyte. Sodium acetate is much less soluble than NaOH at 0° C., which provides a simple separation strategy. To test this strategy, 6.8 ml of the liquid product that was collected from the electrolysis at 144 mA $cm^{-2}$ was concentrated 3× and cooled to 0° C., yielding a white crystalline precipitate. Isolation of the solid by a single filtration afforded 0.355 g of material that was 83% sodium acetate hydrate by mass, with NaOH accounting for the mass balance. The isolated yield from this single precipitation was 47% of the acetate collected in the liquid trap, with no organic impurities.

Figure 10:
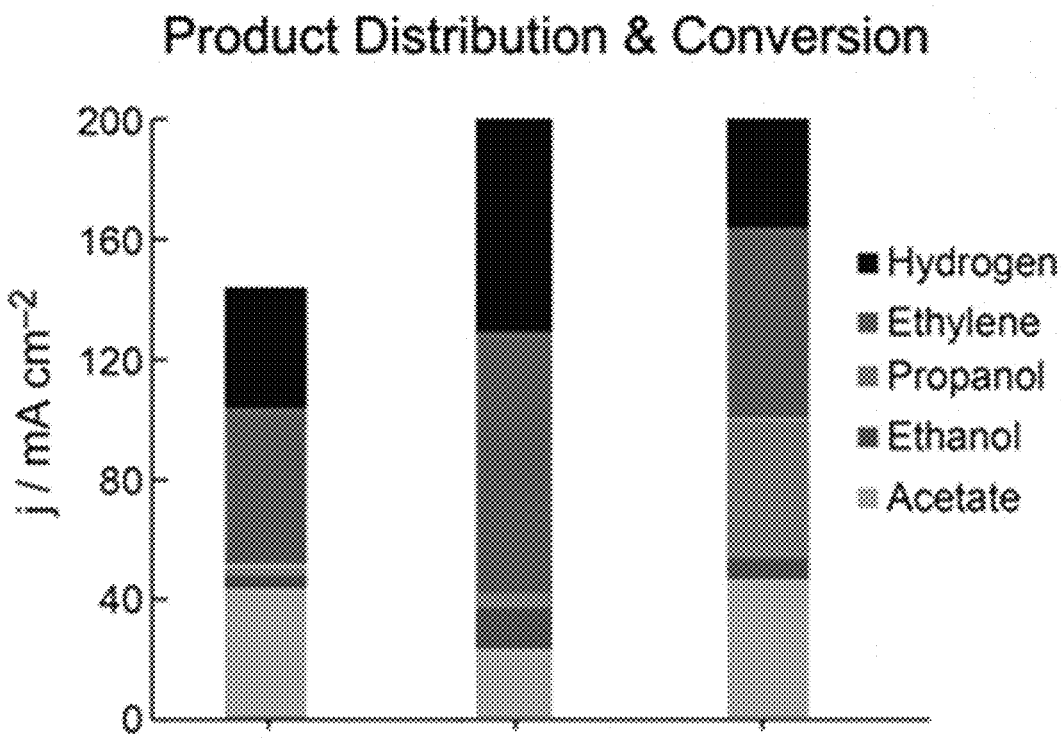
FIG. 10 is a graph that shows product distribution, electrolysis parameters (CO pressure and total cell voltage (E)), total $j_{CO}$, and single-pass conversion for electrolyses in the cell depicted in FIG. 8 with a drop-dried Cu-GDE (left) and two spray-freeze Cu-GDEs (middle and right).

The use of a spray-freeze Cu-GDE provided additional improvements in the cell performance compared to a drop-dried Cu-GDE, as shown in FIG. 10. With 4 bar CO, a total current density of 200 mA $cm^{-2}$ and a $j_{CO}$ of 130 mA $cm^{-2}$ was achieved at a total cell voltage of 2.23 V with a spray-freeze Cu-GDE having a Cu loading of 1400 μg $cm^{-2}$. At 8 bar, a spray-freeze Cu-GDE with 1600 μg $cm^{-2}$ Cu loading achieved 200 mA $cm^{-2}$ total current density and 165 mA $cm^{-2}$ $j_{CO}$ with only 2.05 V total cell potential. Thus, a spray-freeze Cu-GDE was able to lower the cell potential by 270 mV while increasing the total current density for CO reduction compared to a drop-dried Cu-GDE. Interestingly, a relatively high proportion of propanol was obtained with the spray-freeze Cu-GDE at 8 bar (46 mA cm$^{-2}$ partial current density, 23% propanol FE), which shows the ability to tune selectivity by modifying the catalyst layer thickness and operating conditions.

The ability to produce concentrated $C_{2+}$ product streams is particularly useful for the production of isotopically labeled organic compounds. For example, using isotopically labeled CO and/or isotopically labeled water for the electrolytic bath, the use of the cell with a Cu-GDE described here allows for the production of concentrated streams of isotopically labeled ethylene gas or isotopically labeled acetate. In one example, isotopically enriched $^{13}$CO is used instead of CO with natural isotope abundance to generate $^{13}$C-enriched ethylene in the gas product stream and $^{13}$C-enriched acetate, ethanol, and propanol in the liquid product trap. In another example, the electrolyte supplied to the anode is prepared with $D_2O$ instead of $H_2O$. When CO electrolysis is performed in the cell with $D_2O$-enriched electrolyte supplied to the anode, the concentrated ethylene gas phase product and concentrated acetate, ethanol, and propanol liquid phase products will be enriched in deuterium. In other embodiments, the liquid phase solution is a solution of water and one of isotopically labeled formate, acetate, ethylene glycol, oxalate, ethanol, propanol, or allyl alcohol.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, modifications, and various substitute equivalents as fall within the true spirit and scope of the present invention.

What is claimed is:

1. A method for depositing a catalyst layer onto a porous conductive substrate, comprising:
   providing a catalyst ink comprising catalyst particles suspended in a solvent;
   depositing the catalyst ink onto a porous conductive substrate, wherein the solvent of the deposited catalyst ink is frozen, wherein the porous conductive substrate is a gas diffusion electrode and wherein the ink is sprayed onto the gas diffusion electrode and the solvent freezes when the ink is sprayed onto the gas diffusion electrode; and
   sublimating the frozen solvent, leaving the catalyst layer.

2. The method, as recited in claim 1, wherein the solvent comprises isopropanol in tert-butanol.

3. The method, as recited in claim 1, wherein the catalyst particles comprises Cu particles.

4. The method, as recited in claim 1, wherein the catalyst ink further comprises hydrophobic polymer particles.

5. The method, as recited in claim 1, wherein the catalyst ink further comprises polytetrafluoroethylene particles.

6. The method, as recited in claim 1, wherein the sublimating the solvent comprises passing air through the porous conductive substrate.

7. The method, as recited in claim 1, wherein the depositing the catalyst ink deposits a layer of greater than 10 microns.

* * * * *